(12) United States Patent
Fukuda et al.

(10) Patent No.: US 8,193,680 B2
(45) Date of Patent: Jun. 5, 2012

(54) SQUIRREL-CAGE ROTOR AND MANUFACTURING METHOD OF SQUIRREL-CAGE ROTOR

(75) Inventors: Masamoto Fukuda, Yamanashi (JP); Hisashi Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 12/897,814

(22) Filed: Oct. 5, 2010

(65) Prior Publication Data
US 2011/0080067 A1 Apr. 7, 2011

(30) Foreign Application Priority Data

Oct. 7, 2009 (JP) .................. 2009-233597

(51) Int. Cl.
*H02K 17/16* (2006.01)
(52) U.S. Cl. ...................................... 310/211
(58) Field of Classification Search .......... 310/211, 310/156.78, 156.79, 182, 201, 216.017, 216.095, 310/262; 29/598
See application file for complete search history.

(56) References Cited

U.S. PATENT DOCUMENTS

| | | | |
|---|---|---|---|
| 2,927,229 A * | 3/1960 | Merrill | 310/162 |
| 3,375,385 A | 2/1965 | Young | |
| 5,398,404 A | 3/1995 | Meyer et al. | |
| 6,867,522 B1 | 3/2005 | Vlemmings et al. | |
| 7,336,013 B2 * | 2/2008 | Pizzichil | 310/211 |

FOREIGN PATENT DOCUMENTS

| | | |
|---|---|---|
| DE | 3834466 C1 | 11/1989 |
| DE | 19542962 C1 | 11/1996 |
| DE | 69308123 T2 | 8/1997 |
| DE | 10230006 A1 | 1/2004 |
| JP | 52-162414 | 12/1977 |
| JP | 5207714 | 8/1993 |
| JP | 7131962 | 5/1995 |
| JP | 9117119 | 5/1997 |
| JP | 2002335659 | 11/2002 |
| JP | 2004236456 | 8/2004 |
| JP | 2004254433 A | 9/2004 |

OTHER PUBLICATIONS

Japanese Office Action from application No. JP2009-233597.
German Office Action for DE102010047816 mailed Jul. 6, 2011.

* cited by examiner

*Primary Examiner* — Dang Le
(74) *Attorney, Agent, or Firm* — Lowe, Hauptman, Ham & Berner, LLP

(57) ABSTRACT

A squirrel-cage rotor including a rotor core provided with a plurality of circumferentially disposed slot holes opened in a rotational axis direction of the rotor; a pair of end rings disposed at opposite sides of the rotor core in the rotational axis direction of the rotor, each end ring being provided with a plurality of circumferentially disposed through holes opened corresponding to the plurality of circumferentially disposed slot holes; and a plurality of bar elements respectively inserted through the plurality of slot holes and the plurality of through holes. Each of the pair of end rings is prepared by laminating a plurality of sheet members, and opposite ends of each of the plurality of bar elements and the pair of end rings are brazed together through a brazing filler metal sandwiched between adjacent sheet members in advance, the brazing filler metal being adapted to melt and flow when the rotor is heated.

5 Claims, 4 Drawing Sheets

SQUIRREL-CAGE ROTOR AND MANUFACTURING METHOD OF SQUIRREL-CAGE ROTOR

RELATED APPLICATION

The present application is based on, and claims priority from, Japanese Application Number 2009-233597, filed Oct. 7, 2009, the disclosure of which is hereby incorporated by reference herein in its entirety.

BACKGROUND OF THE INVENTION

1. Field of the Invention

The present invention relates to a squirrel-cage rotor used for an induction motor. The present invention also related to a manufacturing method of a squirrel-cage rotor.

2. Description of the Related Art

A squirrel-cage rotor in which electrical conductive bars made of copper or copper alloy are respectively inserted through slot holes of a rotor core and opposite ends of each electrical conductive bar are joined to a pair of end rings by brazing is known. The squirrel-cage rotor described in Japanese Unexamined Patent Publication (kokai) No. 2004-254433 (JP2004-254433A) is configured to form grooves for disposing brazing filler metals on an outer end face in a rotational axis direction of the rotor of each end ring. The rotor is heated so that the brazing filler metals melt and flow into clearances between the end rings and the electrical conductive bars at the back of the grooves.

However, in the squirrel-cage rotor described in JP2004-254433, because the grooves for disposing the brazing filler metals are formed on the outer end faces of each end ring, the end rings have to be thick, and therefore material cost is increased. Further, because the grooves have to be formed, processing cost is also increased.

SUMMARY OF THE INVENTION

One aspect of the present invention provides a squirrel-cage rotor including a rotor core provided with a plurality of circumferentially disposed slot holes opened in a rotational axis direction of the rotor; a pair of end rings disposed at opposite sides of the rotor core in the rotational axis direction of the rotor, each end ring being provided with a plurality of circumferentially disposed through holes opened corresponding to the plurality of circumferentially disposed slot holes; and a plurality of bar elements respectively inserted through the plurality of slot holes and the plurality of through holes. Each of the pair of end rings is prepared by laminating a plurality of sheet members, and opposite ends of each of the plurality of bar elements and the pair of end rings are brazed together through a brazing filler metal sandwiched between adjacent sheet members in advance, the brazing filler metal being adapted to melt and flow when the rotor is heated.

Another aspect of the present invention provides a manufacturing method of a squirrel-cage rotor, including forming a rotor assembly by disposing a pair of end rings at opposite sides in a rotational axis direction of a rotor core provided with a plurality of circumferentially disposed slot holes opened along the rotational axis direction of the rotor, each of the pair of end rings being prepared by laminating a plurality of sheet members and being provided with a plurality of circumferentially disposed through holes opened corresponding to the plurality of slot holes, with a brazing filler metal sandwiched between adjacent sheet members, and respectively inserting a plurality of bar elements through the plurality of slot holes and the plurality of through holes; heating the rotor assembly; and applying a compressive force on opposite sides of the pair of end rings, during heating of the rotor assembly, so that the brazing filler metal sandwiched between the adjacent sheet members melts and flows into clearances between the plurality of bar elements and the plurality of through holes to braze the plurality of bar elements and the pair of end rings through the brazing filler metal.

BRIEF DESCRIPTION OF THE DRAWINGS

The objects, features and advantages of the present invention will become more apparent from the following description of the preferred embodiments in connection with the accompanying drawings, wherein.

DETAILED DESCRIPTION

Figure 1:
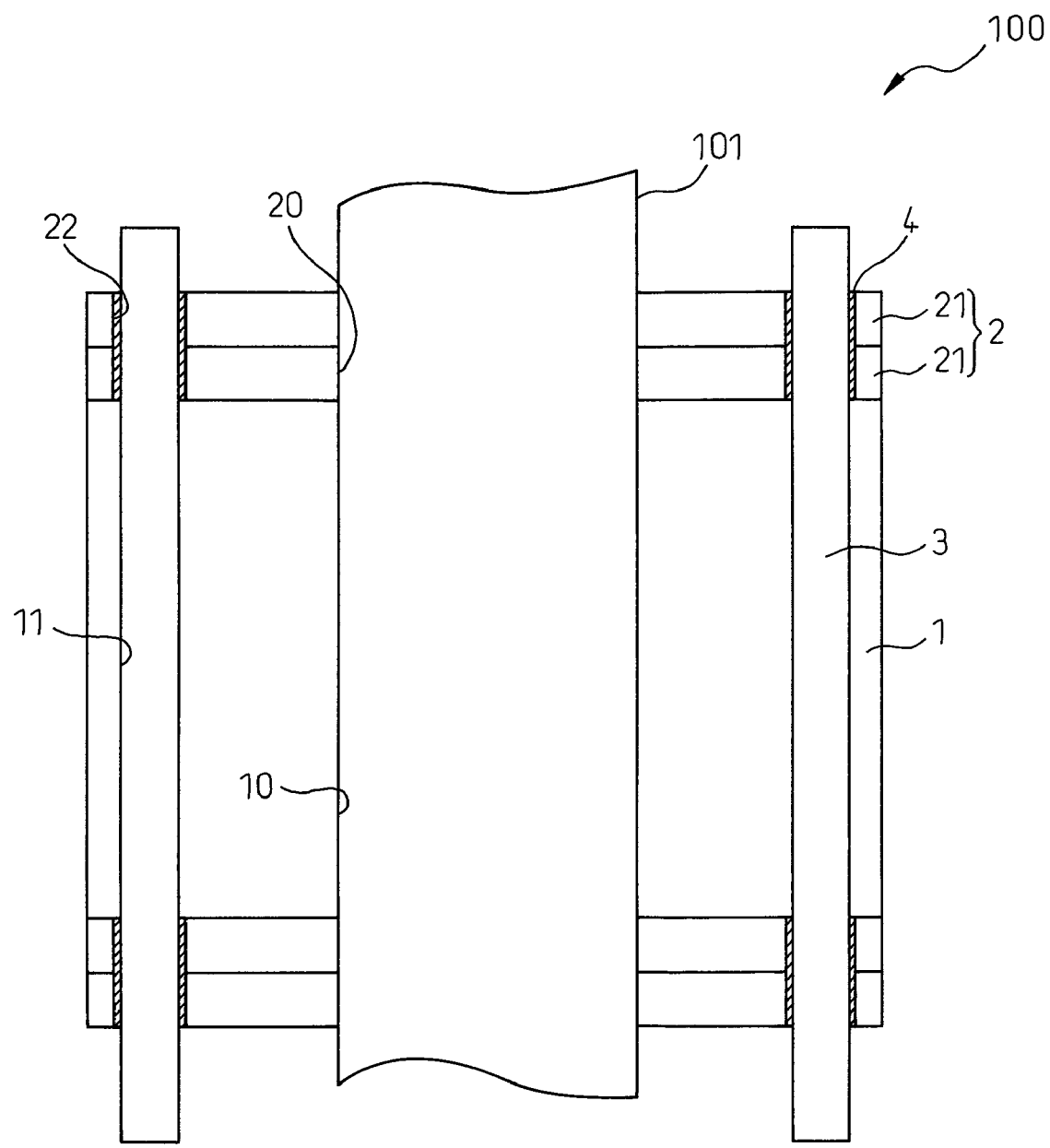
FIG. 1 is a cross-sectional view of a squirrel-cage rotor according to an embodiment of the present invention.

Hereinafter, an embodiment of the present invention will be described with reference to FIGS. 1 to 4. FIG. 1 is a cross-sectional view of a squirrel-cage rotor 100 according to an embodiment of the present invention taken along a rotational axis of the rotor. Squirrel-cage rotor 100 integrally includes a substantially cylindrical rotor core 1, a pair of electrically-conductive end rings 2 disposed at opposite axial ends of rotor core 1, and a plurality of electrically-conductive bar elements 3 passing through rotor core 1 and the pair of end rings 2. This squirrel-cage rotor 100 is integrally attached to a rotating shaft 101 and used as a rotor of an induction motor in a well-known manner. Although not illustrated in the figure, a stator for forming a rotating magnetic field is disposed around squirrel-cage rotor 100 to constitute the induction motor.

Figure 2:
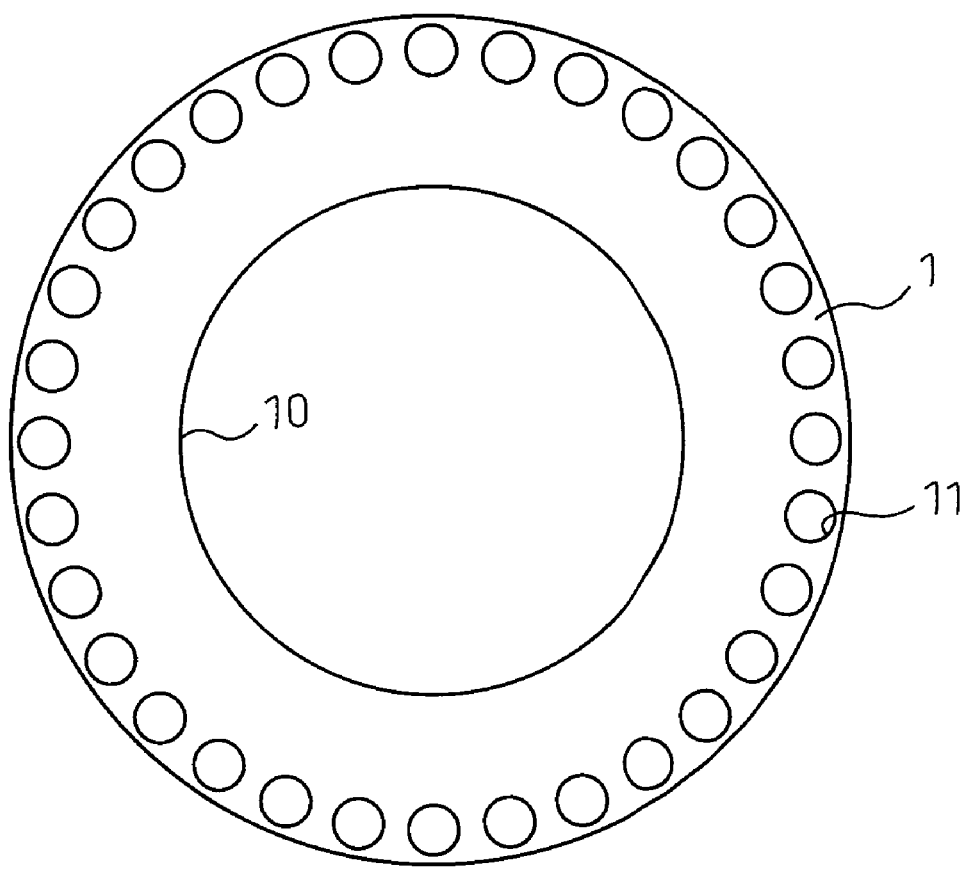
FIG. 2 is a plan view of a rotor core constituting the squirrel-cage rotor of FIG. 1.

FIG. 2 is a plan view of rotor core 1 viewed from the side of the end rings. Rotor core 1 is a substantially ring-like laminated body prepared by laminating thin magnetic steel sheets. A through hole 10 through which rotating shaft 101 is inserted is opened in the center of rotor core 1. Near an outer circumferential surface of rotor core 1, a plurality of circumferentially disposed circular slot holes 11 are opened to pass through rotor core 1 in a rotational axis direction of the rotor.

As illustrated in FIG. 1, each of the pair of end rings 2 is prepared by laminating a plurality of (two in the figure) sheet members 21 made of copper or copper alloy. End ring 2 has a shape similar to that of rotor core 1 of FIG. 2 when viewed from above. A through hole 20 through which rotating shaft 101 is inserted is opened in the center of end ring 2. Near an outer circumferential surface of end ring 2, a plurality of circumferentially disposed circular through holes 22 are opened corresponding to slot holes 11.

Similarly to end rings 2, bar elements 3 are made of copper or copper alloy. Each bar element 3 has a substantially columnar shape and its cross-sectional shape is similar to that of slot hole 11 of rotor core 1 and through hole 22 of end ring 2. Each bar element 3 passes through the slot hole 11 and through hole 22 and opposite ends of each bar element 3 are joined to end rings 2 by brazing 4 such as silver brazing, for example.

As described above, in this embodiment, end rings 2 and bar elements 3 are made of copper or copper alloy whose electrical resistance is lower than that of aluminum. As a result, in comparison with the case when the aluminum is used as structural material, heat generation of an induction motor itself can be reduced. However, because copper or copper alloy has a higher melting point than that of aluminum, it is difficult to manufacture the squirrel-cage rotor of copper or copper alloy by molding such as die casting in comparison with that of aluminum. Consequently, in this embodiment, end rings 2 and bar elements 3 are joined by brazing as follows.

Figure 3:
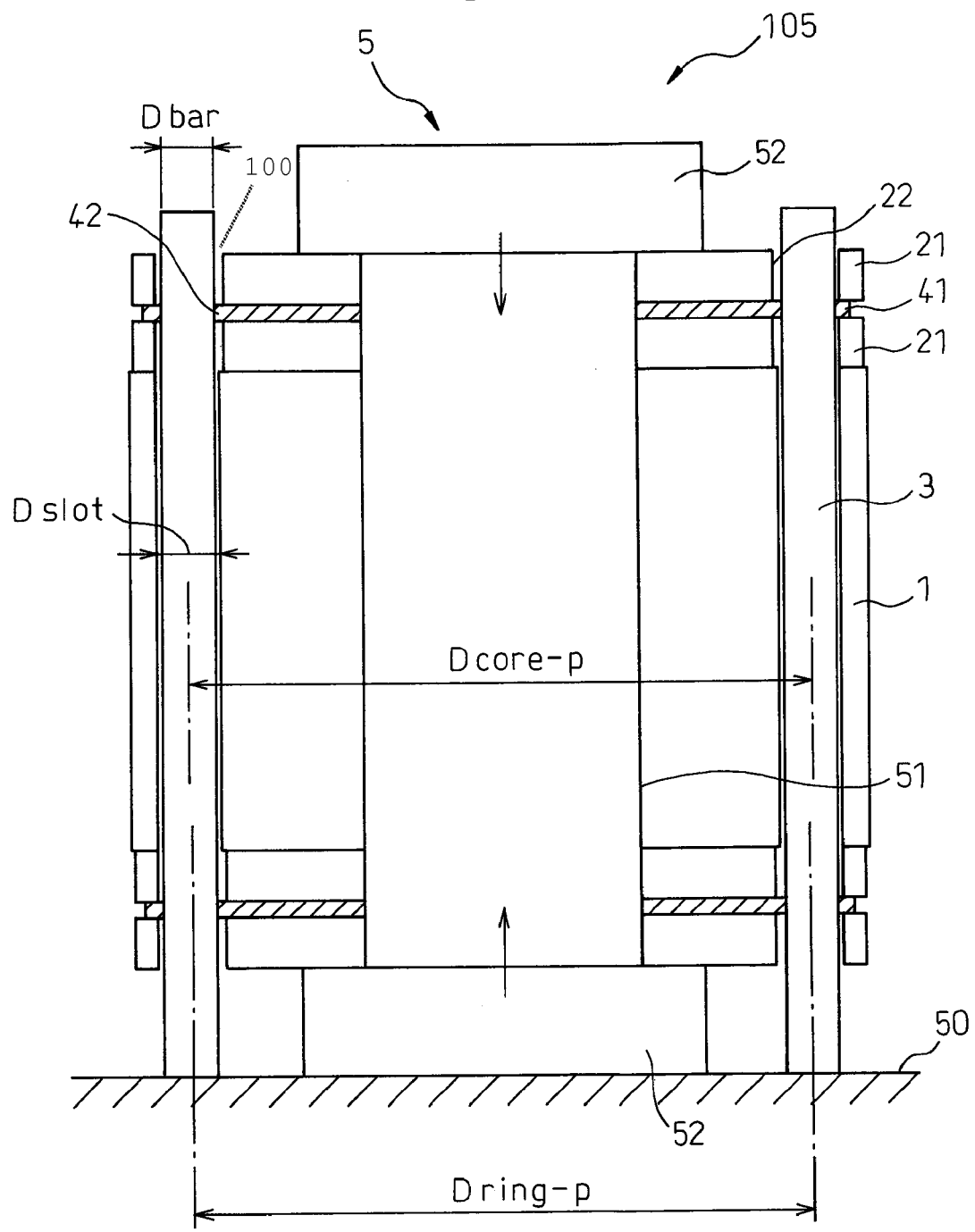
FIG. 3 is a diagram illustrating a manufacturing process of the squirrel-cage rotor of FIG. 1 (before heating the rotor)
Figure 4:
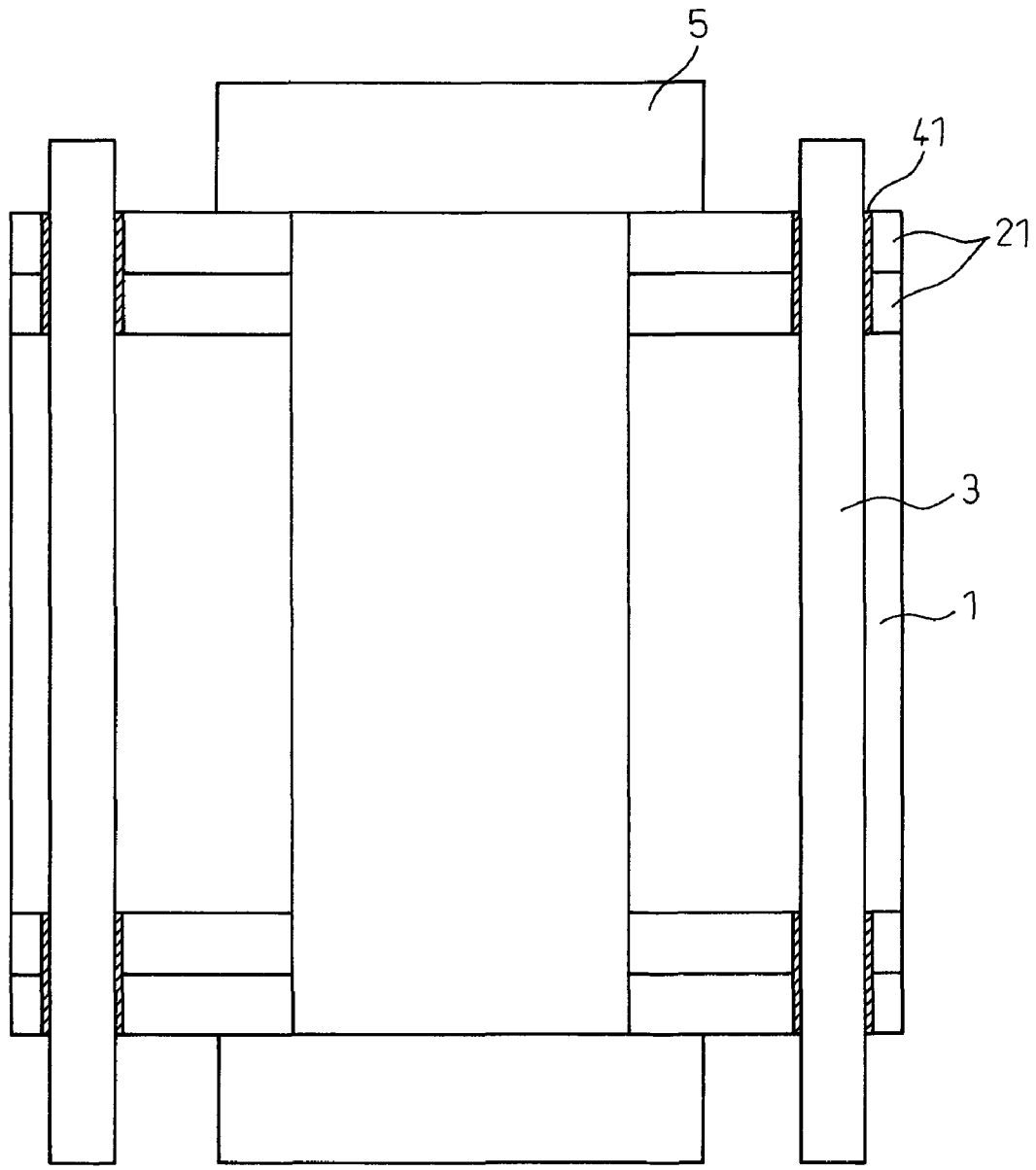
FIG. 4 is a diagram illustrating a manufacturing process of the squirrel-cage rotor of FIG. 1 (when brazing temperature is reached).

FIGS. 3 and 4 are diagrams illustrating a manufacturing process of squirrel-cage rotor 100 according to this embodiment, wherein FIG. 3 illustrates a state before heating the rotor, and FIG. 4 illustrates a state after heating the rotor (when brazing temperature is reached). In order to manufacture squirrel-cage rotor 100, first, a rotor assembly 105 is temporarily assembled by using a jig 5 as illustrated in FIG. 3. Jig 5 has a cylindrical section 51, a lower flange section 52 attached to a bottom side of cylindrical section 51, and an upper flange section 53 attached to a top side of cylindrical section 51. While lower flange section 52 is fixed to cylindrical section 51, upper flange section 53 is provided slidably along an outer circumferential surface of cylindrical section 51. Though not illustrated in the figures, cylindrical section 51 is coupled with upper flange section 53 via a spring member. This spring member maintains constant spring force to compress rotor assembly 105 in a vertical direction as illustrated by arrows in the figures.

Rotor assembly 105 is assembled while jig 5 is vertically disposed as illustrated in the figures, for example. More specifically, while a bottom surface of lower flange section 52 of jig 5 is disposed on a base 50, lower end ring 2 (the pair of sheet members 21), rotor core 1 and upper end ring 2 (the pair of sheet members 21) are successively stacked and, then, bar elements 3 are correspondingly inserted from above through slot holes 11 of rotor core 1 and through holes 22 of upper and lower end rings 2. Bottom surfaces of inserted bar elements 3 abut against an upper surface of base 50 so that vertical positions of bar elements 3 are defined with respect to rotor core 1 and end rings 2. Though the bottom surfaces of bar elements 3 are disposed at the same height as that of the bottom surface of jig 5, they may be disposed at different heights.

Each end ring 2 is comprised of the pair of sheet members 21. When rotor assembly 105 is assembled, a substantially ring-shaped thin brazing filler metal 41 that is formed like a thin sheet in advance is sandwiched between adjacent sheet members 21, as illustrated in FIG. 3. A plurality of through holes 42 corresponding to slot holes 11 illustrated in FIG. 2 are opened in thin brazing filler metal 41. When the rotor is heated, clearances between through holes 22 of end rings 2 and bar elements 3 are filled with thin brazing filler metal 41, as described below. A volume (thickness, diameter and the like) of each thin brazing filler metal 41 is determined in consideration of dimensions of these clearances.

After the above processes, upper flange section 53 is attached to the top side of cylindrical section 51. At this time, the spring member between cylindrical section 51 and upper flange section 53 applies the compressive force (spring force) on top and bottom end faces of upper end ring 2 and top and bottom end faces of lower end ring 2 in the vertical direction.

In this state, by using high-frequency heating, a heating furnace or the like, rotor assembly 105 is heated to a temperature at which thin brazing filler metals 41 melt (for example, about 800° C.). As a result, thin brazing filler metals 41 melt and they are squeezed by the spring force of jig 5. As illustrated in FIG. 4, squeezed brazing filler metals 41 flow into the clearances between through holes 22 of the pair of end rings 2 and bar elements 3 due to capillarity. As a result, the pair of sheet members 21 of each end ring 2 become in contact with each other. In this state, bar elements 3 are brazed to end rings 2.

At this time, in order to eliminate the clearances between slot holes 11 of rotor core 1 and bar elements 3, a diameter of each slot hole 11 and a diameter of each bar element 3 are defined so as to satisfy the following equation (I):

$$D\text{bar}(1+k\,\text{bar}\cdot\Delta T)=D\text{slot}(1+k\,\text{core}\cdot\Delta T) \qquad (I)$$

where Dbar is the diameter of each bar element 3 at ambient temperature, k bar is a linear expansion coefficient of each bar element 3, Dslot is the diameter of each slot hole of rotor core 1 at the ambient temperature, k core is a linear expansion coefficient of rotor core 1, and $\Delta T$ is a difference between the ambient temperature and the brazing temperature.

Substituting representative physical property values of copper and magnetic steel into k bar and k core in the above equation (I), respectively (for example, k bar=$1.8\times10^{-5}$ and k core=$1.2\times10^{-5}$) and substituting a representative temperature condition into $\Delta T$ (for example, $\Delta T$=780° C. based on the ambient temperature=20° C. and the brazing temperature=800° C.), the following equation (II) can be obtained:

$$D\text{bar}/D\text{slot}=0.9954 \qquad (II)$$

Thus, by defining the diameter of each bar element 3 to be 99.54% of the diameter of each slot hole 11, the clearances between bar elements 3 and slot holes 11 can be eliminated when the rotor is heated and, consequently, brazing filler metals 41 can be prevented from flowing into the clearances between bar elements 3 and slot holes 11.

Further, in this embodiment, in order to create circumferentially uniform clearances between through holes 22 and bar elements 3 when the rotor is heated, a pitch circle diameter of slot holes 11 of rotor core 1 and a pitch circle diameter of through holes 22 of end rings 2 are defined as in the following equation (III):

$$D\text{ring-}p(1+k\,\text{ring}\cdot\Delta T)=D\text{core-}p(1+k\,\text{core}\cdot\Delta T) \qquad (III)$$

where Dring-p is the pitch circle diameter of through holes of end rings 2 at the ambient temperature, k ring is a linear expansion coefficient of end rings 2, (in the case of copper, k ring=$1.8\times10^{-5}$), and Dcore-p is the pitch circle diameter of slot holes of rotor core 1 at the ambient temperature.

Substituting the representative physical property values of copper and magnetic steel into k ring and k core in the above equation (III), respectively (for example, k ring=$1.8\times10^{-5}$ and k core=$1.2\times10^{-5}$) and substituting the representative temperature condition into $\Delta T$ (for example, $\Delta T$=780° C. based on the ambient temperature=20° C. and the brazing temperature=800° C.), the following equation (IV) can be obtained:

$$D\text{ring-}P/D\text{core-}p=0.9954 \qquad (IV)$$

Thus, by defining the pitch circle diameter of through holes 22 of end rings 2 to be 99.54% of the pitch circle diameter of slot holes 11 of rotor core 1, the circumferentially uniform clearances between through holes 22 and bar elements 3 are created when the rotor is heated and, consequently, stable brazing strength of bar elements 3 can be obtained.

According to this embodiment, the following effects can be exhibited.

(1) Thin brazing filler metals 41 are sandwiched between adjacent sheet members (the pair of sheet members) 21 so that brazing filler metals 41 melt and flow into the clearances between through holes 22 of end rings 2 and bar elements 3 when the rotor is heated (when the brazing temperature is reached). Consequently, end rings 2 do not have to be thick beyond the brazed areas and material cost can be reduced. Further, because end rings 2 are thin, a size of squirrel-cage rotor 100 can be reduced. Since it is not necessary to form grooves in end rings 2, processing cost can also be reduced.

(2) The diameter of each slot hole 11 of rotor core 1 and the diameter of each bar element 3 are defined to eliminate the clearances between slot holes 11 and bar elements 3 when the rotor is heated. Consequently, melted brazing filler metals 41 can be prevented from flowing into the clearances between slot holes 11 and bar elements 3. Further, because bar elements 3 are naturally positioned by slot holes 11 at the time of the brazing, bar elements 3 do not have to be positioned in a separate step.

(3) The pitch circle diameter of slot holes 11 of rotor core 1 and the pitch circle diameter of through holes 22 of end rings 2 are defined to create circumferentially uniform clearances between through holes 22 of end rings 2 and bar elements 3 when the rotor is heated. Consequently, bar elements 3 can be stably brazed to end rings 2. Reliability of the brazing can be therefore increased.

(4) The spring member is provided inside jig 5 to apply the compressive force on the top and bottom end faces of each end ring 2 when the rotor is heated. Consequently, thin brazing filler metals 41 sandwiched between adjacent sheet members 21 can easily melt and flow into the clearances between bar elements 3 and through holes 22.

(5) End rings 2 and bar elements 3 are made of copper or copper alloy. Consequently, the heat generation of the induction motor can be reduced.

Bar elements 3, slot holes 11 of rotor core 1, and through holes 22 of end rings 2 have respective circular cross-sections in the embodiment described above. However, they may have cross-sections other than circular. In this case, it is preferable that they have similar cross-sections. Though each end ring 2 is prepared by laminating two sheet members 21, may be prepared by laminating three or more sheet members 21. Though end rings 2 and bar elements 3 are made of copper or copper alloy, they may be made of other electrically-conductive materials having low electrical resistance.

Though the spring member is provided inside jig 5 to apply the compressive force on top and bottom end faces of each end ring 2, the means for applying the compressive force is not limited to this example. For example, jig 5 may be made of any material having a linear expansion coefficient at least smaller than rotor core 1 to apply the compressive force due to difference of thermal expansion between jig 5 and squirrel-cage rotor 100 when the rotor is heated.

According to the present invention, because the bar elements and the end rings are brazed by the brazing filler metals that are sandwiched between the adjacent sheet members in advance and that melt and flow, the grooves for disposing the brazing filler metals do not have to be formed in the end rings. As a result, the end rings can be thin and the squirrel-cage rotor can be manufactured at a lower cost.

While the invention has been described with reference to specific preferred embodiments, it will be understood, by those skilled in the art, that various changes or modifications may be made thereto without departing from the scope of the following claims.

The invention claimed is:

1. A squirrel-cage rotor comprising:
    a rotor core provided with a plurality of circumferentially disposed slot holes opened in a rotational axis direction of the rotor;
    a pair of end rings disposed at opposite sides of the rotor core in the rotational axis direction of the rotor, each end ring being provided with a plurality of circumferentially disposed through holes opened corresponding to the plurality of circumferentially disposed slot holes; and
    a plurality of bar elements respectively inserted through the plurality of slot holes and the plurality of through holes,
    wherein opposite ends of each of the plurality of bar elements are joined to the pair of end rings by brazing,
    wherein each of the pair of end rings is prepared by laminating a plurality of sheet members, and
    wherein the plurality of bar elements and each end ring are brazed together through a brazing filler metal sandwiched between adjacent sheet members in advance, the brazing filler metal being adapted to melt and flow by a compressive force applied on both sides of the pair of end rings when the rotor is heated.

2. A squirrel-cage rotor according to claim 1, wherein the plurality of bar elements are made of a material having a linear expansion coefficient larger than a linear expansion coefficient of the rotor core, and are configured so that clearances between outer circumferential surfaces of the plurality of bar elements and inner circumferential surfaces of the plurality of slot holes are eliminated when the rotor is heated.

3. A squirrel-cage rotor according to claim 2, wherein the pair of end rings are made of a material having a linear expansion coefficient larger than a linear expansion coefficient of the rotor core, and are configured so that a pitch circle diameter of the plurality of through holes is equal to a pitch circle diameter of the plurality of slot holes when the rotor is heated.

4. A squirrel-cage rotor according to claim 1, wherein the plurality of bar elements and the pair of end rings are made of copper or copper alloy, respectively.

5. A manufacturing method of a squirrel-cage rotor, comprising:
    forming a rotor assembly by disposing a pair of end rings at opposite sides of a rotor core provided with a plurality of circumferentially disposed slot holes opened along the rotational axis direction of the rotor, each of the pair of end rings being prepared by laminating a plurality of sheet members and being provided with a plurality of circumferentially disposed through holes opened corresponding to the plurality of slot holes, and respectively inserting a plurality of bar elements through the plurality of slot holes and the plurality of through holes;
    heating the rotor assembly; and
    applying a compressive force on opposite sides of the pair of end rings, during heating the rotor assembly, so that a brazing filler metal sandwiched between the adjacent sheet members melts and flows into clearances between the plurality of bar elements and the plurality of through holes to braze the plurality of bar elements and the pair of end rings through the brazing filler metal.

* * * * *